United States Patent [19]
Anzai

[11] Patent Number: 5,706,119
[45] Date of Patent: Jan. 6, 1998

[54] OPTICAL SCANNING APPARATUS WITH A SYMMETRIC FILTER

[75] Inventor: Susumu Anzai, Saitama, Japan

[73] Assignee: Fuji Xerox Co., Ltd., Tokyo, Japan

[21] Appl. No.: 570,567

[22] Filed: Dec. 11, 1995

[30] Foreign Application Priority Data

Dec. 12, 1994 [JP] Japan ................... 6-307846

[51] Int. Cl.$^6$ ................................................. G02B 26/08
[52] U.S. Cl. ................. 359/216; 359/196; 359/209; 359/217; 359/888; 347/259; 347/261
[58] Field of Search ................ 359/196, 197, 359/209, 212, 216–219, 223, 226, 227, 885, 888; 347/134, 135, 253, 259, 261

[56] References Cited

U.S. PATENT DOCUMENTS

| | | | |
|---|---|---|---|
| 3,558,208 | 1/1971 | Hudson | 359/888 |
| 4,978,185 | 12/1990 | Appel | 359/218 |
| 5,331,468 | 7/1994 | Noethen | 359/196 |
| 5,539,441 | 7/1996 | Appel et al. | 347/259 |
| 5,541,779 | 7/1996 | Choi | 359/885 |

Primary Examiner—Paul M. Dzierzynski
Assistant Examiner—Darren E. Schuberg
Attorney, Agent, or Firm—Finnegan, Henderson, Farabow, Garrett & Dunner, L.L.P.

[57] ABSTRACT

There is provided a filter having a member of absorption material between a convex lens and a polygonal mirror. This member of absorption material is formed by coating a thin metallic film. Due to the foregoing, a predetermined transmission factor distribution can be provided. Accordingly, it is possible to correct an uneven distribution of a quantity of light on the photoreceptor caused by a change in F-number in the overfilled optical system, so that the distribution of a quantity of light can be put into practical use.

8 Claims, 8 Drawing Sheets

OPTICAL SCANNING APPARATUS WITH A SYMMETRIC FILTER

BACKGROUND OF THE INVENTION

The present invention relates to an optical scanning apparatus used for a laser beam printer, a digital copier and the like, and more particularly relates to an optical scanning apparatus having a function of correcting the distribution of a quantity of light on a photoreceptor by an optical filter.

FIG. 12 is a schematic illustration of the primary portion of an optical scanning apparatus in which a beam of light, the width of which is wider than the width of a facet of deflection in the scanning direction, is incident upon an optical deflector 100. This optical scanning apparatus will be referred to as an overfilled optical system in this specification, hereinafter.

In this drawing, reference characters are defined as follows. The width of a facet of deflection is Fa; the diameter of an inscribed circle of a polygonal mirror which is an optical deflector 100 is P$\phi$; and the number of facets of deflection is n. Then, the following equation is established.

$$Fa = P\phi \times \tan(180°/n) \quad (1)$$

In this case, a polygonal mirror is used as the optical deflector 100. However, other optical deflectors such as a galvanomirror may be used. In this case, the width Fa of a facet of deflection has no relation with the diameter P$\phi$ of an inscribed circle and the number n of facets of deflection.

In the overfilled optical system, a portion of a beam of light, the intensity of which is distributed in accordance with the Gaussian intensity distribution, is used as if the portion of the beam were cut away from the overall beam of light. Accordingly, the following equation is established. In this case, the reference characters are defined as follows. The width of a beam of light immediately after the reflection on a deflection facet is D; the scanning angle is $\alpha$; and the incident angle on a deflection facet is $\beta$.

$$D = Fa \times \cos\{(\alpha+\beta)/2\} \quad (2)$$

Further, the following equation is established. In this case, reference numerals are defined as follows. F-number is a grade of brightness of an image formed by a lens; the focal distance from the optical deflector 100 to the photoreceptor 102 is f; and the width of a beam of light immediately after the reflection on a deflection facet is D.

$$F\text{-number} = f/D \quad (3)$$

Since an f$\theta$ lens not shown is disposed between the optical deflector 100 and the photoreceptor 102, the focal distance f is constant and has no relation with the scanning angle $\alpha$.

As can be seen in the equations (1) to (3), F-number is changed in accordance with the scanning angle $\alpha$ and the incident angle $\beta$ ($\beta$ is an angle between a scanning optical axis and an incident (deflector) axis) on the deflection facet. When F-number is changed, a quantity of light is changed according to a scanning position on the photoreceptor 102. In general, the overfilled optical system has the following problems. In the overfilled optical system, a portion of a beam of light, the intensity of which is distributed in accordance with the Gaussian intensity distribution, is used as if the portion of the beam were cut away from the overall beam of light correspondingly to the scanning angle $\alpha$, so that F-number is changed. Due to the foregoing, the quantity of light is not uniformly distributed on the photoreceptor 102.

An arrangement to solve the above problems is disclosed in U.S. Pat. No. 3,558,208. In FIG. 13, there is shown an optical scanning apparatus 104 which is disclosed in the above patent. In the optical scanning apparatus 104, between a light source 106 and an optical deflector 108 composed of a polygonal mirror, there are provided a collimator lens 110, convex lens 112, filter 114 and f$\theta$ lens 116, which are successively disposed in this order from the side of the light source 106 to the side of the optical deflector 108. The filter 114 is provided with a member of absorption material 114A, the thickness of which is distributed in the parabolic profile.

According to the above arrangement, a beam of light emitted by the light source 106 is transmitted through the collimator lens 110 and the convex lens 112, so that the beam of light is made to be substantially parallel. Then the beam of light is further transmitted through the filter 114 and the f$\theta$ lens 116 and subjected to deflection scanning by the optical deflector 108. The beam of light which has been made to be parallel rays by the convex lens 112 is transmitted through the filter 114 having the member of absorption material 114A, the thickness of which is distributed in the parabolic profile. Therefore, when the beam of light is incident upon the optical deflector 108, the intensity distribution is changed from the Gaussian intensity distribution to the rectangular intensity distribution. As shown in FIG. 14, when only a substantially flat central portion is used with respect to the diameter A of the beam of the Gaussian intensity distribution, that is, when the width of utilization is B, the aforementioned uneven distribution of quantity of light on the photoreceptor 118 can be somewhat corrected even if the filter 114 is not arranged. However, in this case, portions except for the central portion are not utilized, so that the loss of energy is large. Therefore, according to the arrangement disclosed in the above US Patent, in order to reduce the loss of energy while the distribution of quantity of light on the photoreceptor 118 is maintained to be uniform, the filter 114 is provided so that the distribution of intensity of the beam of light can be converted into the rectangular intensity distribution. That is, the width of utilization is determined to be C.

In the above US Patent, there is no description of a change in the distribution of quantity of light on the photoreceptor 118 which is caused when F-number is changed in accordance with the scanning angle, wherein this change is intrinsic to the overfilled optical system. However, there is the following problems in the above patent. That is, only when the beam of light of the Gaussian intensity distribution incident upon the optical deflector 108 is converted into the beam of the rectangular intensity distribution, it is impossible to correct the uneven distribution of the quantity of light which is caused by a change in F-number. To be more specific, a sectional shape of the member of absorption 114A attached onto the filter 114 is parabolic. Therefore, the intensity distribution of the beam incident upon the optical deflector 108 is only converted from the Gaussian intensity distribution to the rectangular distribution, and it is impossible to correct the distribution of the quantity of light in accordance with a change in F-number caused in accordance with the scanning angle, which is intrinsic to the overfilled optical system.

However, in the case where the scanning angle of the optical deflector 108 is small, the intensity distribution of the beam on the photoreceptor 118 is sufficiently uniform so that it can be put into practical use without causing any problems.

SUMMARY OF THE INVENTION

The present invention has been accomplished to solve the above problems. It is an object of the present invention to provide an optical scanning apparatus in which the uneven distribution of a quantity of light on the photoreceptor caused by a change in F-number is corrected so that the distribution of a quantity of light can be enhanced to a level which can be put into practical use without causing any problems.

An optical scanning apparatus according to an embodiment of the present invention comprising a light source; an optical deflector having a plurality of deflection facets disposed on a circumferential surface of the deflector, a beam emitted from the light source being deflected and made to scan in a predetermined direction by said deflection facets; a first optical system for converting the beam from the light source into an image wider than a width of one deflection facet in a scanning direction so that the image straddles the plurality of deflection facets of the deflector; and a second optical system for converging the deflected beam onto a surface to be scanned; characterized in that a filter is disposed between the light source and the deflector, and the filter has an uneven transmission factor distribution so that a distribution of a quantity of light in a primary scanning direction on the surface to be scanned is made substantially uniform.

According to the present invention, since the filter having the uneven transmission factor distribution is disposed between the light source and the deflector, it is possible to correct only a necessary portion of the distribution of the light quantity on a photoreceptor so that an ideal distribution can be obtained. Accordingly, in the overfilled optical system in which F-number is changed in accordance with a scanning angle and an incident angle on the deflection facet, it is possible to assure uniformity of the distribution of the light quantity.

DETAILED DESCRIPTION OF THE INVENTION

Referring to FIGS. 1 to 8, a first embodiment of the present invention will be explained.

Figure 2:
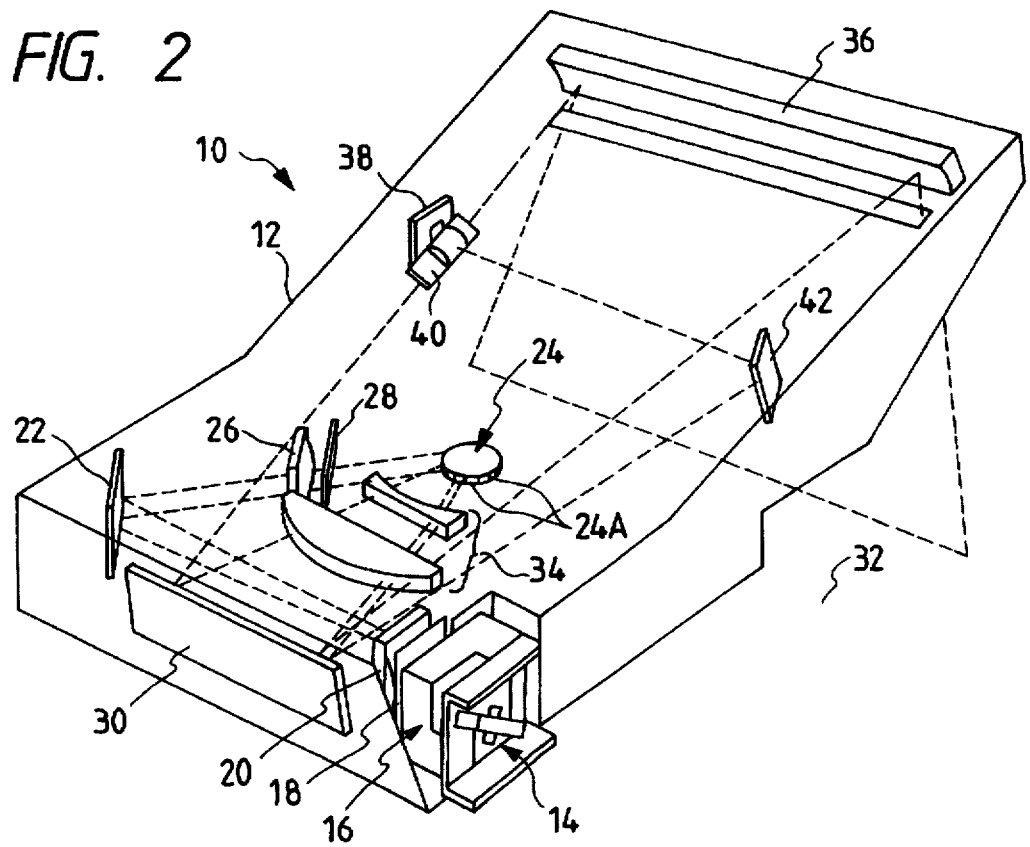
FIG. 2 is a perspective view of an overall arrangement of the optical scanning apparatus of the embodiment of the present invention.

FIG. 2 is a view showing an overall arrangement of the optical scanning apparatus 10 of this embodiment. In this connection, the optical scanning apparatus 10 of this embodiment is used for a laser beam printer, a digital copier and the like. Referring to FIG. 2, the overall arrangement of the optical scanning apparatus 10 will be explained.

The optical scanning apparatus 10 is provided with a housing 12, the shape of which is predetermined. On one side of the housing 12 in the width direction, there is provided a laser diode assembly 14 which is used as a light source. A laser beam is emitted by the laser diode assembly 14. On the light projection side of the laser diode assembly 14, there is provided a collimator lens assembly 16 by which the laser beam projected from the laser diode assembly 14 is changed into gentle divergent rays. At a position adjacent to the collimator lens assembly 16, there is provided a slit 18 for forming a laser beam. At a position adjacent to the slit 18, there is provided a cylindrical lens 20 having a radius of curvature only in the subsidiary scanning direction so that an image can be formed on the deflection facet in the subsidiary direction.

Also, on the other side of the housing 12 in the width direction, there is provided a flat mirror 22. On the flat mirror 22, the laser beam that has passed through the cylindrical lens 20 is reflected toward the inside of the housing 12. At the center inside the housing 12, there is provided a polygonal mirror 24 which is used as an optical deflector. The polygonal mirror 24 is a rotation multiplane mirror. On the circumferential surface of the polygonal mirror 24, there are provided a plurality of deflection facets 24A, the width of which is set to a predetermined deflection facet width. The polygonal mirror 24 is rotated around the central axis at a predetermined angular velocity. Between the flat mirror 22 and the polygonal mirror 24, there are provided a convex lens 26 to make the reflected light on the flat mirror 22 to be substantially parallel rays, and a filter 28 used for correcting the distribution of a quantity of light. This filter 28 used for correcting the distribution of a quantity of light will be described later.

On one side of the housing 12 in the longitudinal direction, there is provided another flat mirror 30. Between this flat mirror 30 and the aforementioned polygonal mirror 24, there is provided an fθ lens 34 for forming an image on the photoreceptor 32 by refracting the beam deflected on the polygonal mirror 24.

On the other side of the housing 12 in the longitudinal direction, there is provided a cylindrical mirror 36 to correct a tilt of the beam, which has been reflected on the flat mirror 30, in the subsidiary scanning direction.

Due to the arrangement described above, the beam emitted by the laser diode assembly 14 is subjected to deflection-scanning on the photoreceptor 32 by the polygonal mirror 24.

Other than the above arrangement, in the optical scanning apparatus 10, there is provided an SOS sensor 38 to detect a reference position (timing) of the primary scanning conducted by the polygonal mirror 24, and further there are provided an SOS lens 40 and an SOS pickup mirror 42.

Next, the filter 28 disposed between the polygonal mirror 24 and the convex lens 26 will be explained in detail.

Figure 1:
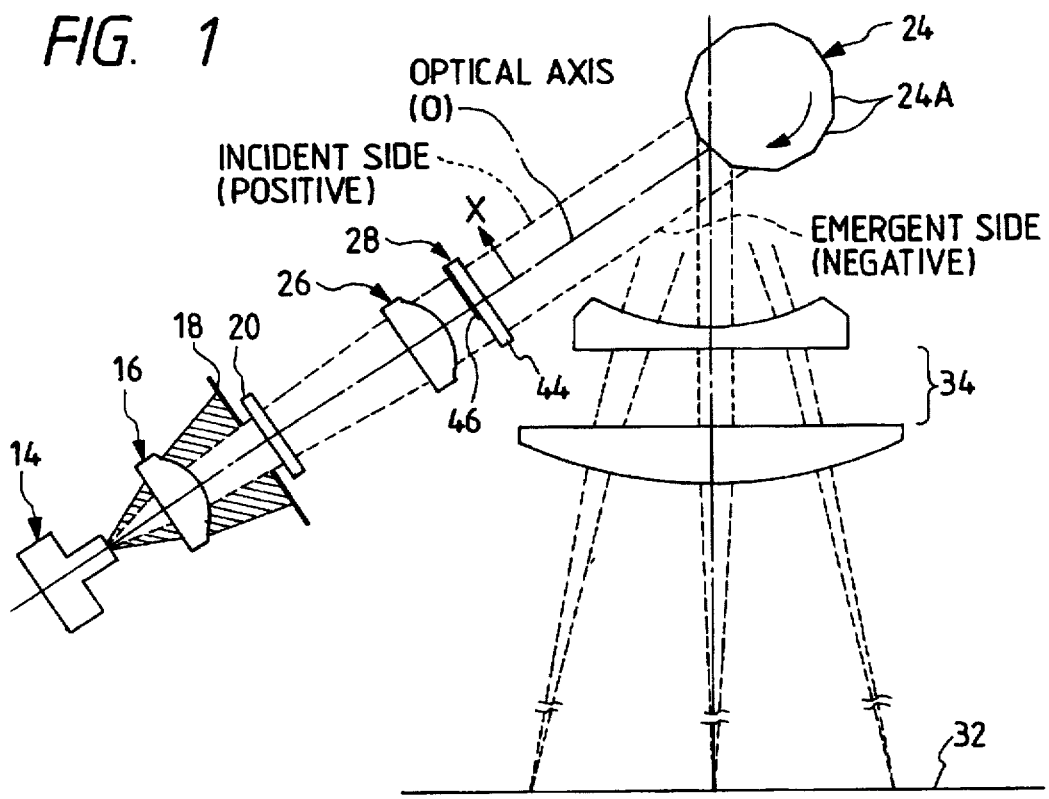
FIG. 1 is a schematic illustration of a model of an optical system of the optical scanning apparatus according to an embodiment of the present invention.
Figure 3:
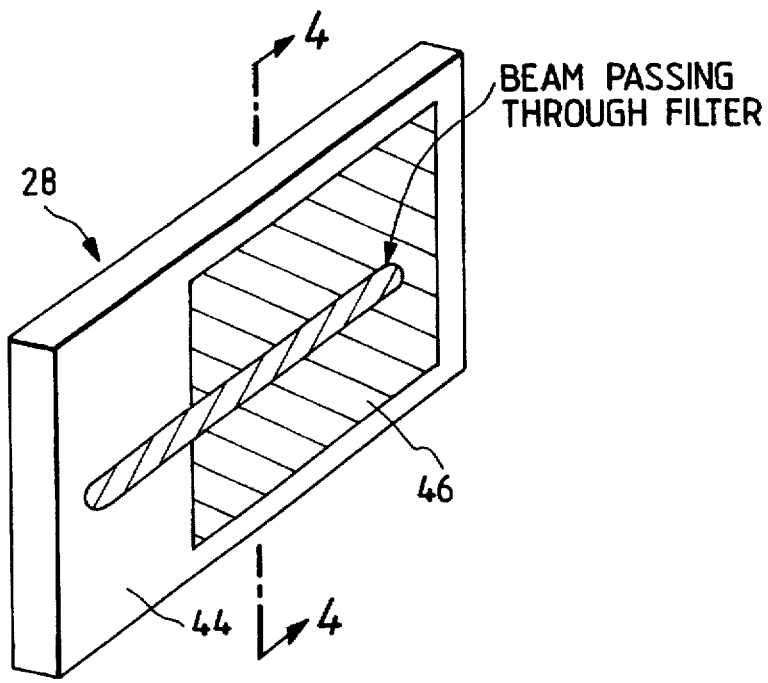
FIG. 3 is a perspective view of the filter shown in FIG. 1.
Figure 4:
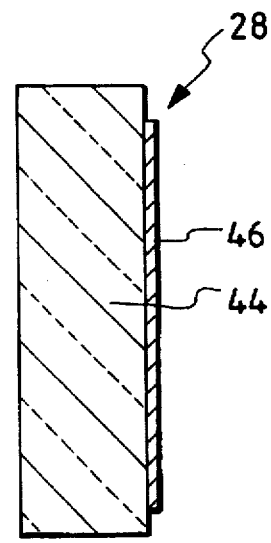
FIG. 4 is a cross-sectional view of the filter taken on line 4—4 in FIG. 3.
Figure 5:
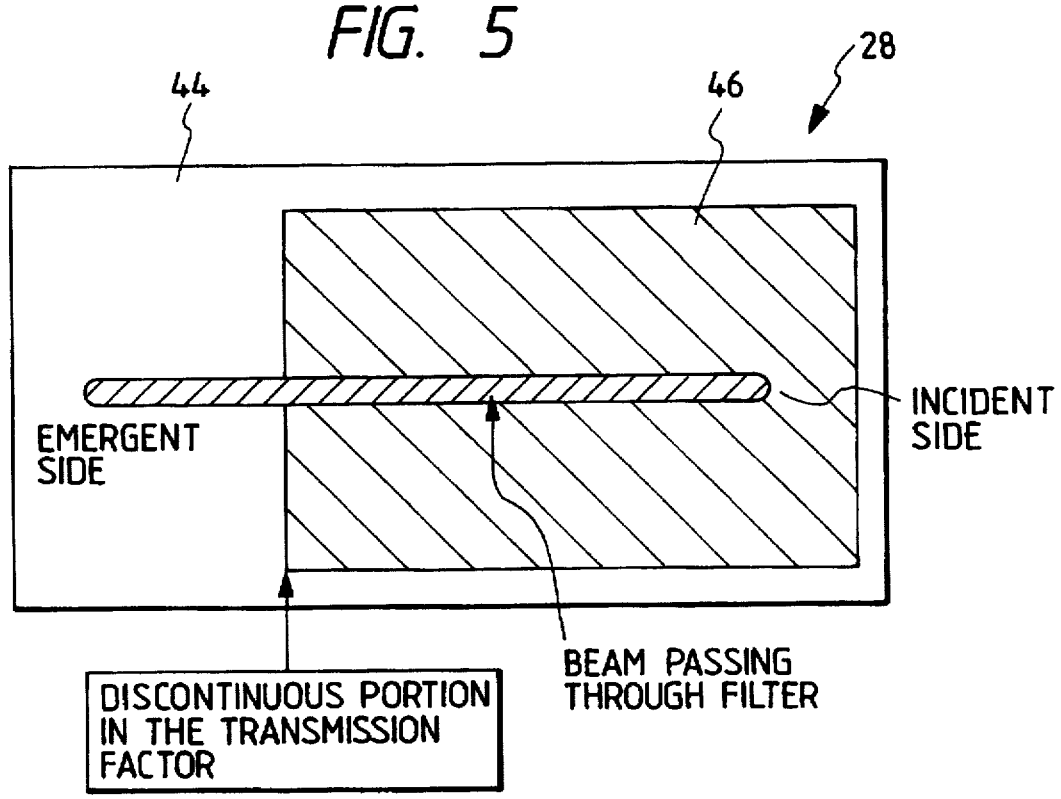
FIG. 5 is a front view of the filter shown in FIG. 3.

FIG. 1 is a schematic illustration showing an optical system of the above optical scanning apparatus 10 including the filter 28. FIG. 3 is a perspective view of the filter 28. FIG. 4 is a cross-sectional view of the filter 28 taken on line 4—4 in FIG. 3. FIG. 5 is a front view of the filter 28.

Figure 6:
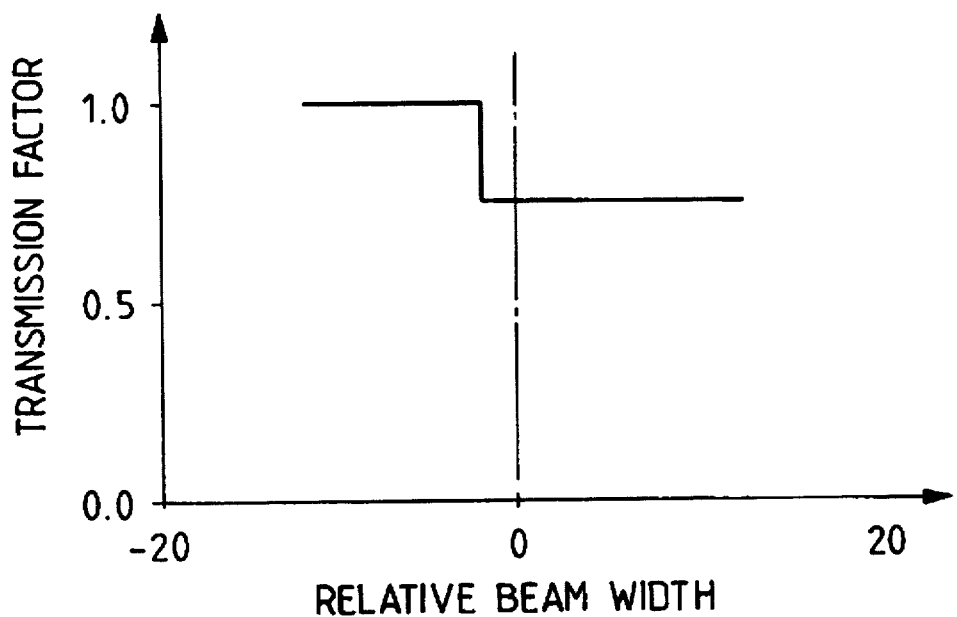
FIG. 6 is a diagram showing a transmission factor distribution of the beam of the filter shown in FIG. 3.
Figure 7:
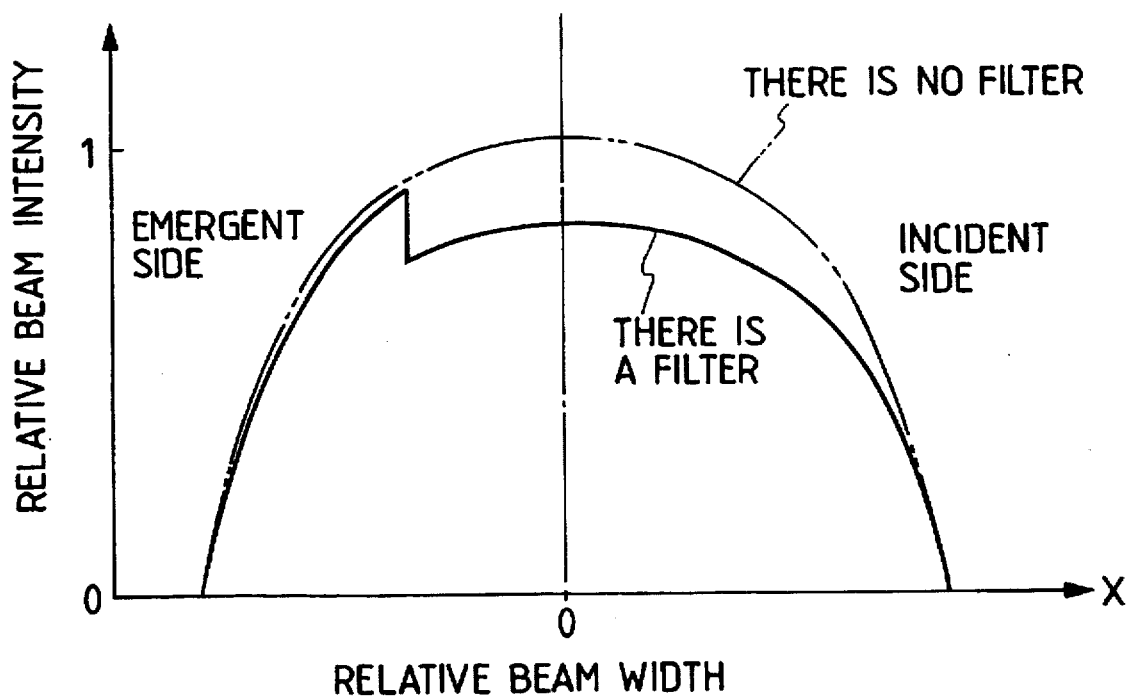
FIG. 7 is a diagram showing a profile of the beam transmitted through the filter of the embodiment of the present invention.

As shown in these drawings, the filter 28 includes a filter main body 44 composed of a parallel glass plate. On a surface of the filter main body 44 on the convex lens 26 side, absorption material 46 is coated so that the transmission factor of the beam can be reduced. In this connection, for example, the absorption material 46 is coated by the method of coating a thin metallic film. The absorption material 46 is coated in a region not less than half of the side of the filter main body 44. Due to the foregoing, the transmission factor of the beam in the region where the absorption material 46 is not coated is 93%, and the transmission factor of the beam in the region where the absorption material 46 is coated is 67.1%. In this connection, a discontinuous portion (shown in FIG. 5) in the transmission factor distribution is formed by conducting masking on an emergent side with respect to the scanning direction when the absorption material is coated. More specifically, in this embodiment, the width of the beam incident upon the deflection facet is approximately 10 mm. In this case, the discontinuous portion in the transmission distribution is set at a position distant from the optical axis by X=−2 mm on the emergent side in the scanning direction. FIG. 6 is a graph showing an outline of the distribution of the transmission factor with respect to the relative beam width of the filter 28 in the arrangement described above. As shown in the diagram of FIG. 6, the distribution of the transmission factor is not symmetrical with respect to the optical axis, and the distribution is discontinuous, in which one discontinuous portion, that is, one step portion is formed.

Operations of this embodiment will now be explained.

Laser beams emitted by the laser diode assembly 14 are changed into gentle divergent rays by the collimator lens assembly 16. Then the rays pass through the slit 18 so as to be formed into a predetermined profile. After the formation, the rays of light pass through the cylindrical lens 20 and are made into substantially parallel rays. Then the parallel rays are incident upon the filter 28. After the rays of light have been transmitted through the filter 28, they are deflected by the polygonal mirror 24 and subjected to deflection scanning on the photoreceptor 32.

Figure 8A:
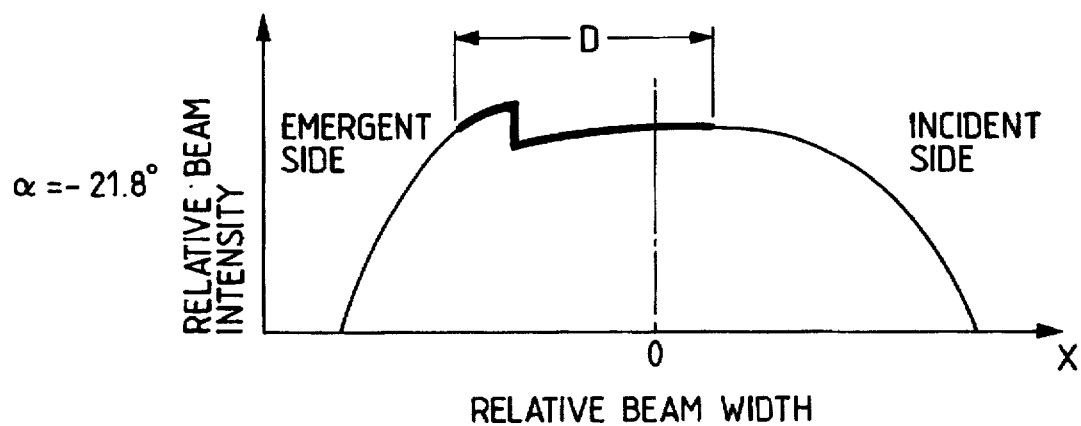
FIGS. 8(A) to 8(C) are graphs respectively showing a cutout portion on the deflection facet corresponding to the scanning angle.
Figure 8B:
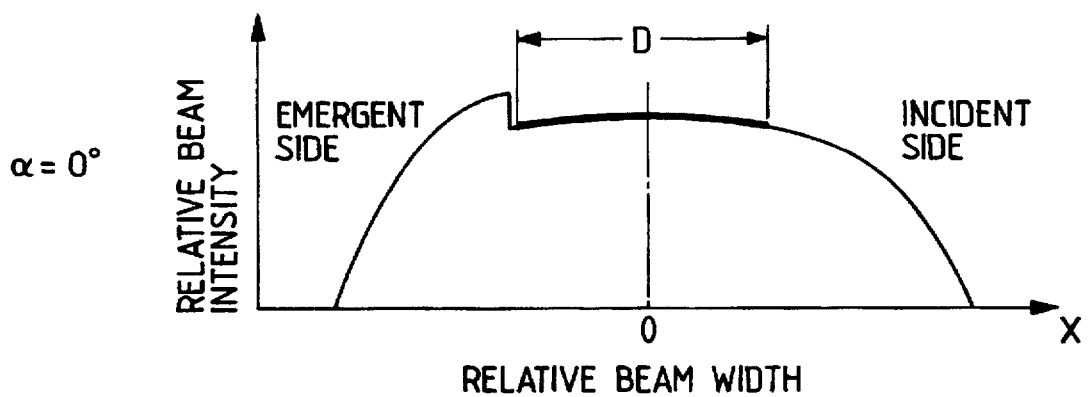
Figure 8C:
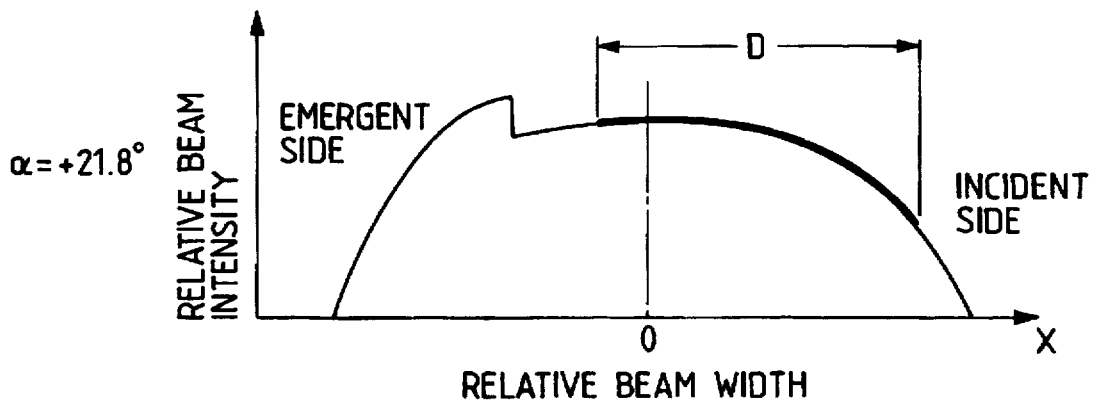

In this embodiment, the member of absorption material 46 is attached at a predetermined position on the filter 28. Accordingly, as shown in FIG. 6, the transmission factor distribution of the filter 28 is low on the incident side and high on the emergent side of the optical deflector. Therefore, when the filter 28 is not provided, the beam profile is formed according to the Gaussian intensity distribution as illustrated by a two-dotted chain line in FIG. 7. On the other hand, in this embodiment in which the filter 28 is provided, the beam profile is formed in such a manner that the intensity of a portion is damped as illustrated by a solid line in FIG. 7. As shown in FIG. 8(A), in the case of the scanning angle α=−21.8, a portion D illustrated by a thick line, in which the intensity is damped, is used. In the same manner, in the case of the scanning angle α=0, a portion D shown in FIG. 8(B) illustrated by a thick line is used. In the case of the scanning angle α=21.8, a portion D shown in FIG. 8(C) illustrated by a thick line is used. As a result, the distribution of a quantity of light on the photoreceptor 32 can be corrected.

With reference to the specific data, explanations will be made as follows.

On the following Table 1, there is shown a distribution of a quantity of light on the photoreceptor 32 in the overfilled optical system having no filter 28 of the present invention. This is a comparative example to be compared with the embodiment of the invention. In this example, the wave length of semiconductor laser beams is 780 nm, n=15, α=±21.6°, β=45°, and f=286.48 mm. The distribution of a quantity of light shown in the following Table 1 is the data obtained when the quantity of light is 100% in the case of α=0°.

TABLE 1

| α (°) | −21.6 | −20 | −15 | −10 | −5 | 0 | 5 | 10 | 15 | 20 | 21.6 |
|---|---|---|---|---|---|---|---|---|---|---|---|
| Quantity of light (%) | 84.9% | 86.8% | 90.3% | 94.9% | 97.3% | 100% | 100.7% | 100.7% | 99.9% | 98.0% | 97.4% |

As can be seen on the above Table 1, in this overfilled optical system, a quantity of light on the photoreceptor 32 is reduced by 15.1% in the case of G=−21.6. Accordingly, in the above case, there is a possibility that the density of a print obtained in the development process is lowered. Therefore, this case will cause problems when it is put into practical use. In this connection, depending upon the development process, when a quantity of light on the photoreceptor 32 is not more than 10%, practical problems are not caused.

On the other hand, when the filter 28 is arranged between the convex lens 26 and the polygonal mirror 24 in this embodiment, the distribution of a quantity of light is shown in the following Table 2. In this connection, the data shown in the following Table 2 is obtained by means of computation. However, the same result was provided by an experiment made by the inventor.

To make up for the explanation, as shown in FIG. 5, a profile of the beam passing through the filter 28 is substantially linear in the scanning direction. At a scanning angle by which a beam striding the discontinuous portion in the transmission factor distribution is deflected, the beam immediately after the reflection on the deflection facet includes an area in which the transmission factor is 67.1% and an area in which the transmission factor is 93%. The above distribution of a quantity of light was computed in accordance with this ratio. In this computation, an edge portion of the deflection facet was replaced with the coordinate X in the incident light flux scanning direction. In this case, the conversion to the coordinate X was conducted according to the following equation.

$$X = \tfrac{1}{2} \times P\phi \times \sin(\beta/2) - R\{(\alpha+\beta)/2 \pm 180°/n\}$$

where R: $P\phi/2\{\cos(180/n)\}^{-1}$

According to the above equation, at each scanning angle, an area ratio of the transmission factor 67.1% and an area ratio of the transmission factor 93% were obtained with respect to the overall effective width reflected from a position of the discontinuous portion of the filter. In this way, the total transmission factor was computed. In this computation, since the beam was substantially linear in the scanning direction, it was neglected that the beam passing through the filter 28 had the Gaussian intensity distribution. In this connection, concerning the quantity of light in the case of $\alpha=0°$, a quantity of light which had passed through the filter was defined as 100%.

vided on the filter 28 by coating a metallic thin film. Therefore, it is possible to reduce the coating film thickness to a very small value. Consequently, although the beam strides the discontinuous portion in the transmission factor distribution, it is possible to reduce a phase difference between the transmission wave facets of the beam that has been transmitted through the filter. Therefore, it is possible to correct the distribution of a quantity of light without collapsing the beam profile. In this connection, depending upon the manufacturing process, in some cases, in a short section not longer than 0.5 mm, the transmission factor is continuously changed in the discontinuous portion of the transmission factor distribution. Even in this case, it is possible to provide a sufficiently high effect of correcting the distribution of a quantity of light.

Figure 9:
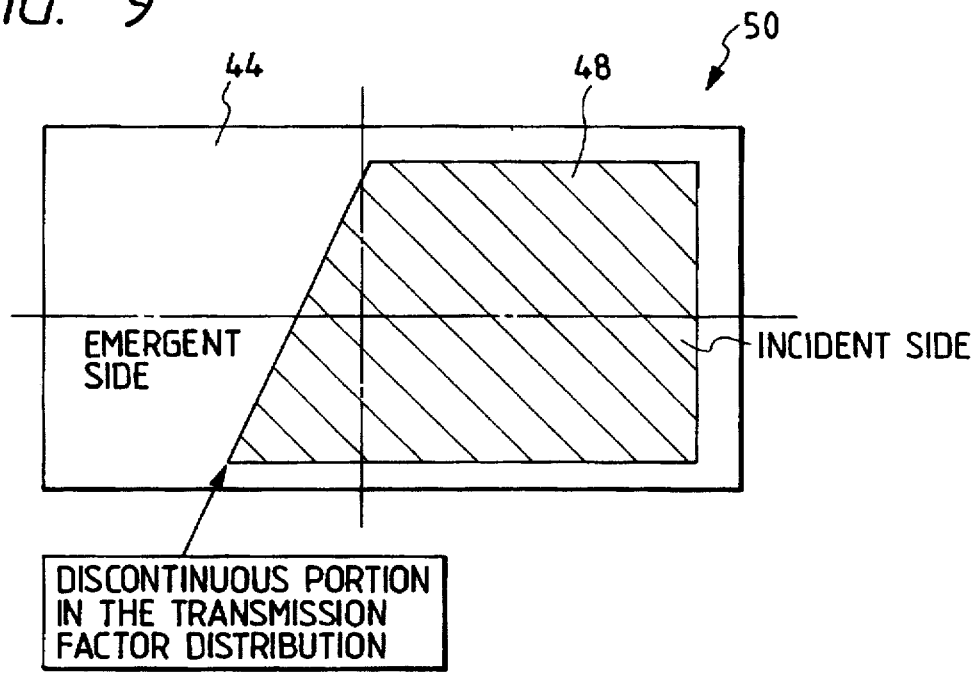
FIG. 9 is a front view corresponding to FIG. 5 in which a variation of the filter is shown.

In the first embodiment, a profile of the member of absorption material 46 coated on the filter 28 is rectangular in the front view. However, as shown in FIG. 9, it is possible to use a filter 50 on which the absorption material 48 is

TABLE 2

| α (°) | −21.6 | −20 | −15 | −10 | −5 | 0 | 5 | 10 | 15 | 20 | 21.6 |
|---|---|---|---|---|---|---|---|---|---|---|---|
| Quantity of light (%) | 96.6% | 97.9% | 98.8% | 100.8% | 100.3% | 100% | 99.5% | 99.5% | 98.7% | 96.8% | 96.2% |

As can be seen in the above Table 2, in this embodiment, when $\alpha=-21.6°$, a quantity of light on the photoreceptor 32 was reduced only by 3.4%. Accordingly, there is no possibility in this embodiment that the density of a print obtained by the development process is lowered. The distribution can be said to be at a level (5%p—p) in which no problems occur in practical use.

As described above, according to this embodiment, in the overfilled optical system in which F-number is changed in accordance with the scanning angle α and the deflection facet incident angle β, the filter 28, the transmission factor distribution of which is predetermined, is arranged between the convex lens 26 and the polygonal mirror 24. Accordingly, it is possible to make the distribution of a quantity of light on the photoreceptor 32 to be uniform.

In this embodiment, the member of absorption material 46 is attached in a predetermined range on the filter 28 by means of coating. Consequently, it is possible to reduce a phase difference between the transmission wave surfaces of the beam that has been transmitted through the filter 28 as small as possible. That is, the following is known. When a beam strides the discontinuous portion in the transmission factor distribution as shown in FIG. 5, a phase difference is physically caused between the transmission wave surfaces. Due to the foregoing, a beam profile formed in the photoreceptor 32 collapses. In general, the beam diameter is defined by 13.5% of the peak value. However, when the phase difference is increased, the side lobe exceeds 13.5% in some cases, wherein the side lobe is defined as a component which is raised from the skirts of a main beam. Accordingly, there is a possibility that the required quality can not be accomplished. However, according to the present embodiment, the member of absorption material 46 is procoated so that a profile of the member of absorption material 48 can be a trapezoid in the front view. In this case, the discontinuous portion in the transmission factor distribution is not perpendicular to the scanning direction but inclined with respect to the scanning direction.

Figure 10:
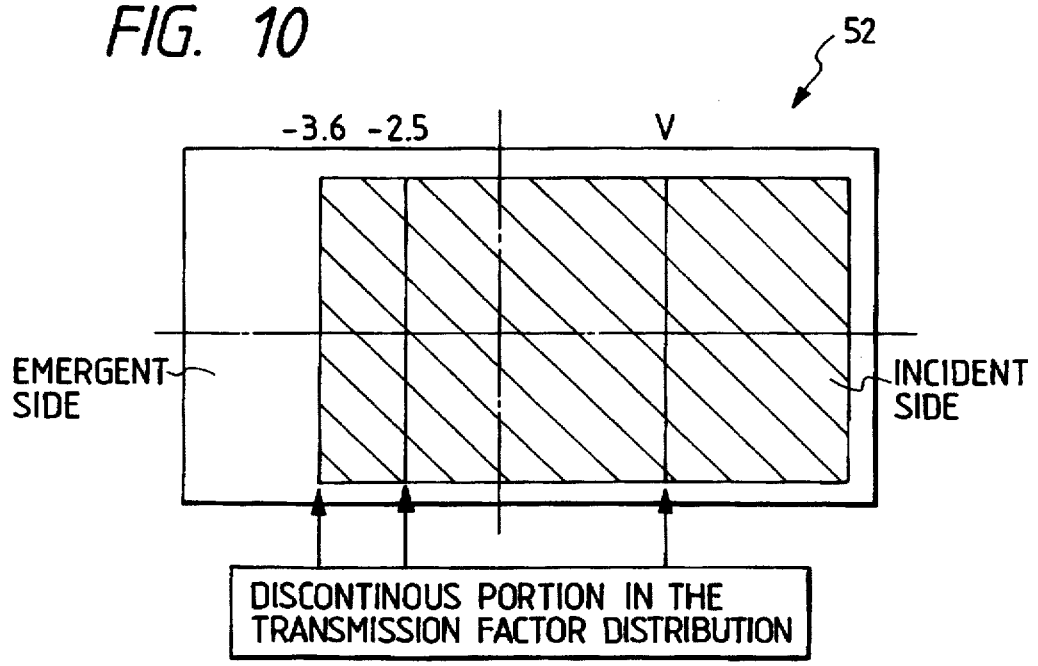
FIG. 10 is a front view corresponding to FIG. 5 in which another variation of the filter is shown.

Further, in the first embodiment, the transmission factor of the filter 28 is set at two steps. However, the transmission factor of the filter 28 may be set at not less than three steps. For example, on the filter 52 shown in FIG. 10, there are provided three discontinuous portions in the transmission factor distribution. On this filter 52, the discontinuous portions are set at the positions of −3.6 mm, −2.5 mm and +4.0 mm in the scanning direction. The transmission factors are respectively set at 93.0%, 67.1%, 45.0% and 67.1% in this order from the negative side (the emergent side). This arrangement can be provided by the following means. For example, a range on one side of the filter 52 from −2.5 mm to +4 mm in the scanning direction is coated with absorption material, the transmission factor of which is 67.1%, and a range on the other side of the filter 52 from −3.6 mm to the positive side (the incident side) is entirely coated with absorption material, the transmission factor of which is 67.1%. Alternatively, one side of the filter 52 may be coated twice with absorption material, the transmission factor of which is 67.1%, under the condition that the positions at which absorption material is coated are shifted. The former arrangement is advantageous in that the filter can be most easily made.

The distribution of a quantity of light on the photoreceptor 32 is shown in the following Table 3 when the filter 52 of the above arrangement is used.

TABLE 3

| α (°) | −21.6 | −20 | −15 | −10 | −5 | 0 | 5 | 10 | 15 | 20 | 21.6 |
|---|---|---|---|---|---|---|---|---|---|---|---|
| Quantity of light (%) | 101.9% | 101.5% | 100.3% | 101.0% | 99.1% | 100% | 100.7% | 100.7% | 99.9% | 99.2% | 100.2% |

As can be seen in the above Table 3, it is possible to provide a distribution of a quantity of light of 3%p—p in this embodiment.

Figure 11A:
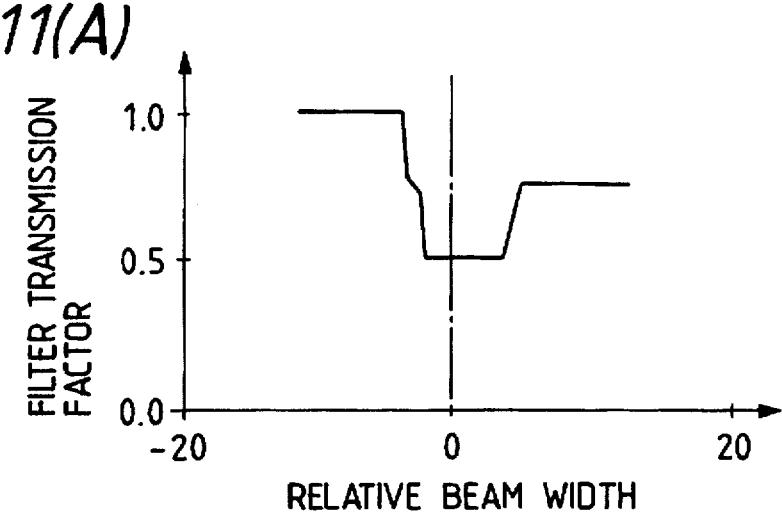
FIGS. 11(A) to 11(C) are views showing another variation of the filter and correspond to FIG. 6 in which an exemplary usable transmission factor distribution is shown.
Figure 11B:
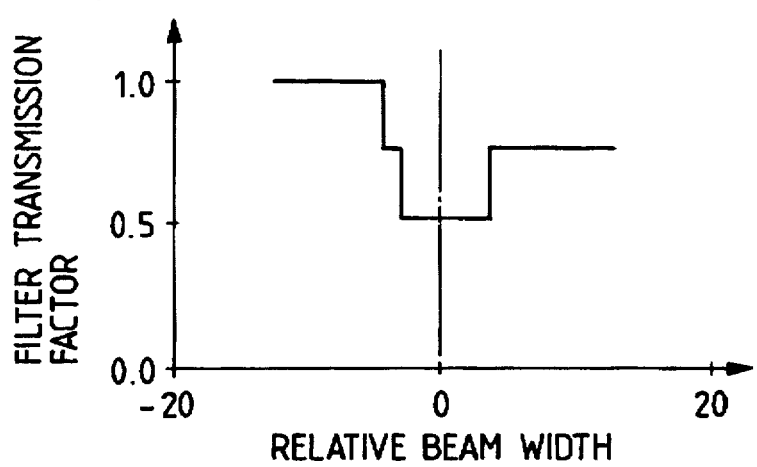
Figure 11C:
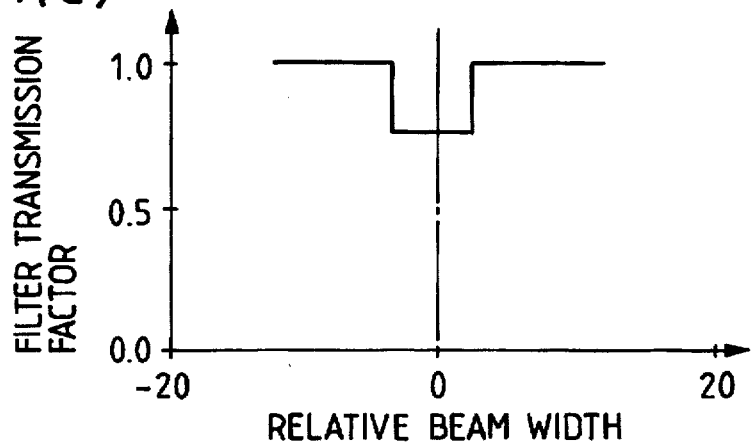
Figure 12:
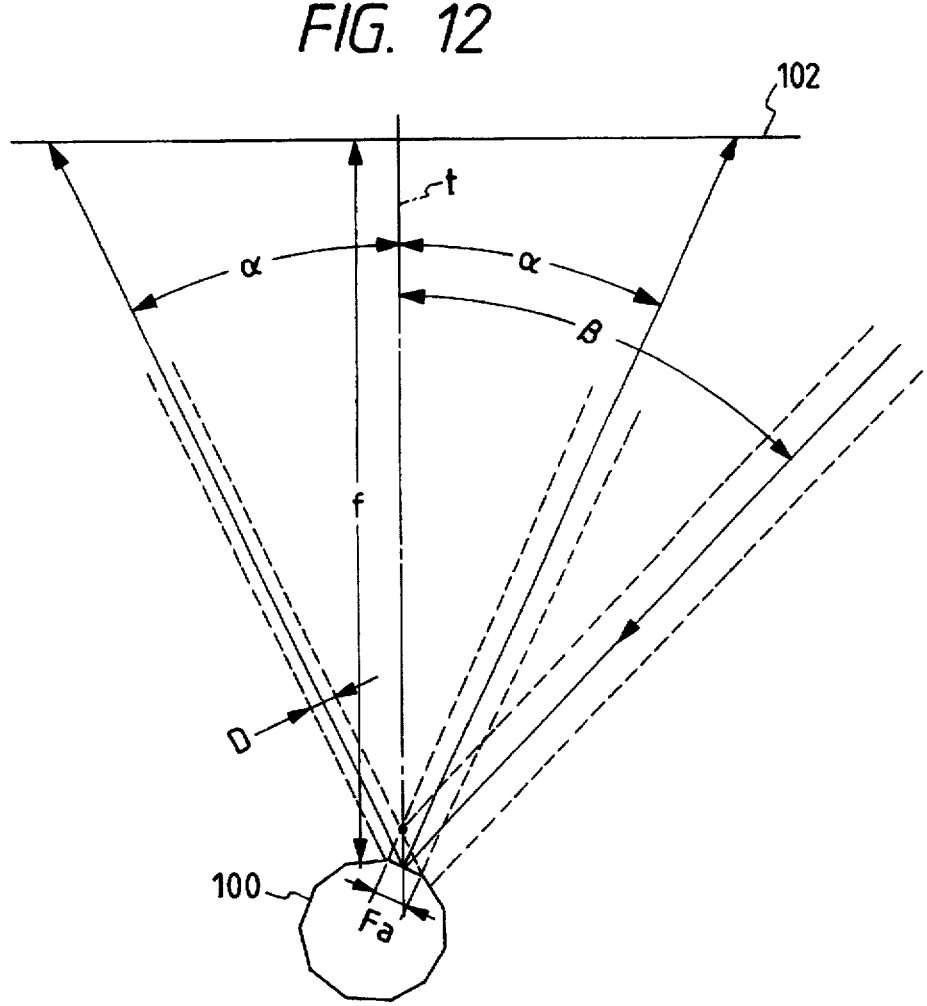
FIG. 12 is a schematic illustration showing a model of a conventional overfilled optical system.
Figure 13:
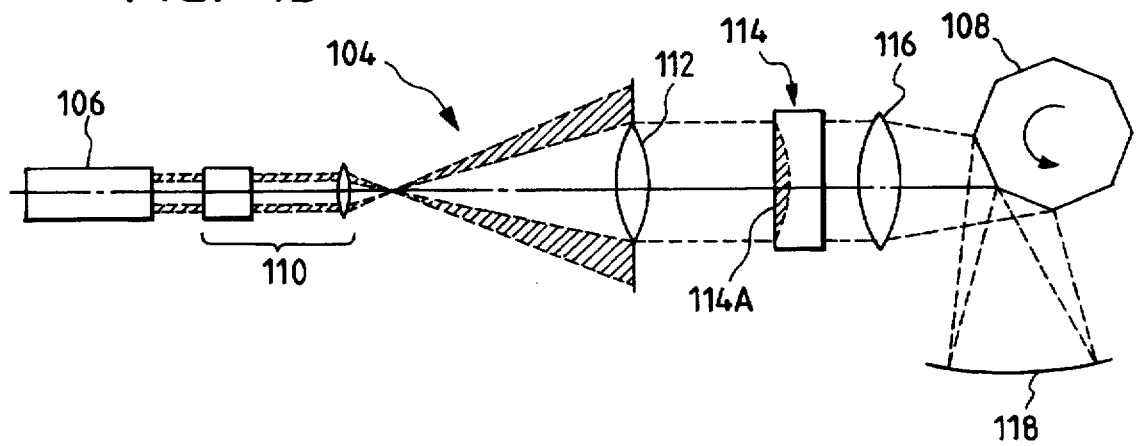
FIG. 13 is a schematic arrangement showing an arrangement of an overfilled optical system provided with a conventional filter.
Figure 14:
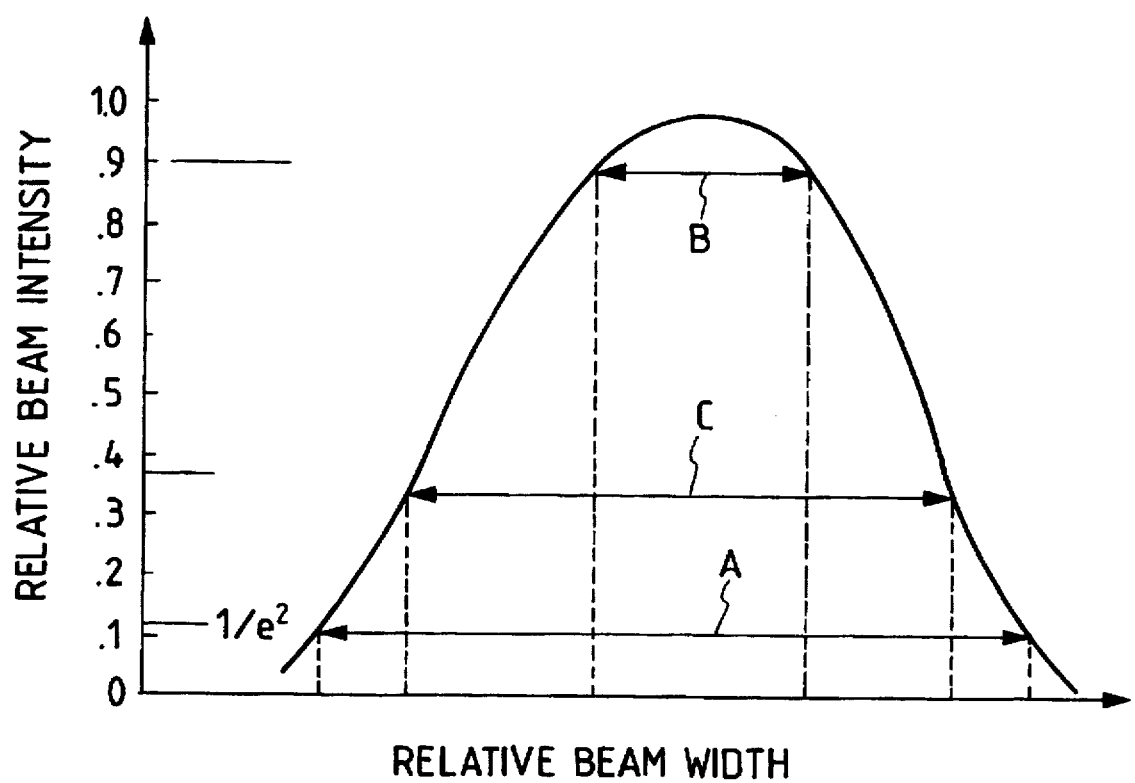
FIG. 14 is a diagram showing a profile of the beam which has passed through the filter in the case of the arrangement shown in FIG. 13.

Further, in the first embodiment, the filter 28 is used, the transmission factor of which is shown in FIG. 6. However, it should be noted that the present invention is not limited to the specific filter, but any filter may be used as long as the transmission factor distribution is not symmetrical with respect to the optical axis or alternatively the transmission factor distribution is discontinuous. Examples in which the transmission factor distribution of the filter is not symmetrical with respect to the optical axis are shown in FIGS. 11(A) and 11(B). Examples in which the transmission factor distribution of the filter is discontinuous are shown in FIGS. 11(A) to 11(C). Any of these filters may be applied, or alternatively filters, the transmission factor distributions of which are different from the above values, may be used.

To make up for the explanation, a filter, the transmission factor distribution of which is set as shown in FIG. 11(C), is used in the case in which the scanning direction incident angle β upon the deflection facet 24A is set at 0°. In this case, the beam width D immediately after the reflection on the deflection facet is expressed by the following equation in the overfilled optical system in which the wave length of semiconductor laser beams is 780 nm, n=15, α=±21.6°, β= 0°, and f=286.48 mm when the quantity of light is 100% in the case of α=0°.

$$D = Fa \times \cos(\alpha/2)$$

Due to the foregoing, a change in F-number is symmetrical in the scanning direction with respect to the positive and negative values. When the scanning angle α is increased, a quantity of light is decreased. However, incident rays and emergent rays on the deflection facet are not on the same plane. Accordingly, as shown in FIG. 11(C), when the transmission factor distribution is made to be discontinuous and the transmission factor at the center is lowered and the transmission factors on both ends are raised, the distribution of a quantity of light can be improved. Especially, when the width of the low transmission factor portion at the center is made to be the same as Fa or not less than Fa, the effect of correction can be enhanced.

Further, in the first embodiment, the filter 28 is held being fixed at a predetermined position. However, it should be noted that the present invention is not limited to the specific embodiment, but the filter 28 may be movably arranged so that the filter 28 can be moved in a desired direction. In this case, the filter 28 may be moved in either the primary scanning direction or the subsidiary scanning direction. When the movable arrangement of the filter 28 is adopted, the filter may be moved by a necessary distance so as to adjust the set position in the case where the filter set position deviates from the initial position or the discontinuous portion in the transmission factor distribution becomes inaccurate. Therefore, the movable filter arrangement is advantageous in that a quantity of light can be appropriately corrected even in this case.

As explained above, the optical scanning apparatus of the present invention can provide the following excellent effects. In the overfilled optical system, an uneven distribution of a quantity of light on the photoreceptor caused by a change in F-number can be corrected to a level which causes no problems in practical use.

What is claimed is:

1. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector, the first optical system having an optical axis;

a second optical system for converging said deflected beam onto a surface to be scanned; and a filter disposed between said light source and said deflector, said filter having an asymmetrical transmission factor distribution with respect to said optical axis so that a distribution of a quantity of light in a primary scanning direction on said surface to be scanned is made substantially uniform.

2. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector, the first optical system having an optical axis;

a second optical system for converging said deflected beam onto a surface to be scanned; and a filter disposed between said light source and said deflector, said filter having an asymmetrical transmission factor distribution with respect to said optical axis in which a transmission factor is varied in steps.

3. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector;

a second optical system for converging said deflected beam onto a surface to be scanned; and a filter disposed between said light source and said deflector, said filter having an uneven transmission factor distribution so that a distribution of a quantity of light in a primary scanning direction on said surface to be scanned is made substantially uniform;

wherein with respect to said scanning direction on said surface to be scanned, when an angle between an optical axis of said first optical system and an optical axis of said second optical system is set at a value other than 0°, said transmission factor distribution of said filter is set so that said transmission factor becomes sequentially large from a further side from said optical axis of said second optical system.

4. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector;

a second optical system for converging said deflected beam onto a surface to be scanned; and a filter disposed between said light source and said deflector, said filter having a transmission factor distribution in which a transmission factor is changed stepwise;

wherein with respect to said scanning direction on said surface to be scanned, when an angle between an optical axis of said first optical system and an optical axis of said second optical system is set at a value other than 0°, said transmission factor distribution of said filter is set so that said transmission factor becomes sequentially large from a further side from said optical axis of said second optical system.

5. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector;

a second optical system for converging said deflected beam onto a surface to be scanned; and a filter disposed between said light source and said deflector, said filter having an uneven transmission factor distribution so that a distribution of a quantity of light in a primary scanning direction on said surface to be scanned is made substantially uniform;

wherein, with respect to said scanning direction on said surface to be scanned, when an angle between an optical axis of said first optical system and an optical axis of said second optical system is set at 0°, said transmission factor distribution of said filter is set so that said transmission factor near said optical axis of said first optical system is less than said transmission factor at side portions of said transmission factor distribution.

6. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector;

a second optical system for converging said deflected beam onto a surface to be scanned; and a filter disposed between said light source and said deflector, said filter having a transmission factor distribution in which a transmission factor is changed stepwise;

wherein, with respect to said scanning direction on said surface to be scanned, when an angle between an optical axis of said first optical system and an optical axis of said second optical system is set at 0°, said transmission factor distribution of said filter is set so that said transmission factor near said optical axis of said first optical system is less than said transmission factor at side portions of said transmission factor distribution.

7. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector;

a second optical system for converging said deflected beam onto a surface to be scanned; and a filter disposed between said light source and said deflector, said filter having an uneven transmission factor distribution so that a distribution of a quantity of light in a primary scanning direction on said surface to be scanned is made substantially uniform;

wherein said filter is movable in said scanning direction by a predetermined amount.

8. An optical scanning apparatus, comprising:

a light source;

an optical deflector having a plurality of deflection facets disposed on a circumferential surface of said deflector, a beam emitted from said light source being deflected and made to scan in a predetermined direction by said deflection facets;

a first optical system for converting said beam from said light source into an image with a width wider than a deflection facet width in a scanning direction so that said image straddles said plurality of deflection facets of said deflector;

a second optical system for converging said deflected beam onto a surface to be scanned; and a filter disposed between said light source and said deflector, said filter having a transmission factor distribution in which a transmission factor is changed stepwise;

wherein said filter is movable in said scanning direction by a predetermined amount.

* * * * *